(12) United States Patent
Dixit et al.

(10) Patent No.: US 11,190,118 B2
(45) Date of Patent: Nov. 30, 2021

(54) SYSTEM FOR CONTROLLING ELECTRICAL POWER GENERATED BY A PERMANENT MAGNET MACHINE

(71) Applicant: SEDEMAC MECHATRONICS PVT LTD, Maharashtra (IN)

(72) Inventors: Amit Dixit, Maharashtra (IN); Arvind Athavale, Maharashtra (IN); Anaykumar Joshi, Maharashtra (IN)

(73) Assignee: SEDEMAC MECHATRONICS PVT LTD, Maharashtra (IN)

( * ) Notice: Subject to any disclaimer, the term of this patent is extended or adjusted under 35 U.S.C. 154(b) by 378 days.

(21) Appl. No.: 16/487,938

(22) PCT Filed: Nov. 23, 2017

(86) PCT No.: PCT/IN2017/050554
§ 371 (c)(1),
(2) Date: Aug. 22, 2019

(87) PCT Pub. No.: WO2018/096563
PCT Pub. Date: May 31, 2018

(65) Prior Publication Data
US 2021/0297021 A1 Sep. 23, 2021

(30) Foreign Application Priority Data
Nov. 23, 2016 (IN) .............................. 201621040029

(51) Int. Cl.
*H02P 6/20* (2016.01)
*H02P 9/48* (2006.01)
*H02M 1/00* (2006.01)

(52) U.S. Cl.
CPC ............ *H02P 6/20* (2013.01); *H02M 1/0085* (2021.05); *H02P 9/48* (2013.01)

(58) Field of Classification Search
CPC ............ H02P 6/20; H02P 9/48; H02M 1/0085
See application file for complete search history.

(56) References Cited

U.S. PATENT DOCUMENTS 4,883,973 A  11/1989 Lakey et al.
6,046,511 A   4/2000 Kincaid
(Continued)

FOREIGN PATENT DOCUMENTS

WO  1990016105 A1  12/1990

OTHER PUBLICATIONS

USPTO, "International Search Report for PCT Application No. PCT/IN2017/050554", US, dated Apr. 13, 2018.

*Primary Examiner* — Zoheb S Imtiaz
(74) *Attorney, Agent, or Firm* — Locke Lord LLP; Tim Tingkang Xia, Esq.

(57) ABSTRACT

A system for controlling electrical power generated by a permanent magnet machine coupled to an internal combustion engine includes a central processing unit configured to determine speed of the machine, and compare the machine speed with a predetermined range of machine speeds, a series power switching circuit connected between the machine and a battery, a bus decoupling power switch connected between a voltage bus and the battery, and a bridge switching circuit connected between the voltage bus and the machine and configured to amplify voltage generated by the machine if the machine speed is less than a predetermined value or fall within a predetermined range thereby charging the battery with amplified voltage even at lower machine speeds. The central processing unit selectively connects the bridge switching circuit with the battery by actuating the bus decoupling switch and/or the series power switching circuit depending upon the machine speed.

7 Claims, 5 Drawing Sheets

(56) References Cited

U.S. PATENT DOCUMENTS

| | | |
|---|---|---|
| 2003/0163296 A1 | 8/2003 | Richards et al. |
| 2004/0217723 A1* | 11/2004 | Cai ................... F02N 11/0866 318/268 |
| 2008/0157592 A1 | 7/2008 | Bax et al. |
| 2013/0161948 A1 | 6/2013 | Sarokhan |
| 2013/0320903 A1 | 12/2013 | Aalund et al. |
| 2014/0239876 A1 | 8/2014 | Hao et al. |
| 2015/0102782 A1* | 4/2015 | Nakayama .............. B60L 50/51 322/21 |

* cited by examiner

SYSTEM FOR CONTROLLING ELECTRICAL POWER GENERATED BY A PERMANENT MAGNET MACHINE

FIELD OF THE INVENTION

The present invention relates to a system for controlling electrical power generated by a permanent magnet machine coupled to an internal combustion engine.

DESCRIPTION OF THE BACKGROUND ART

For starting of an internal combustion (IC) engine, it needs to be rotated at a sufficiently high speed before the self-sustaining combustion process can commence. For this purpose, many conventional IC engines are equipped with an electric starter system. The electric starter system consists of an electric motor powered by a battery, the motor being connected to crankshaft of IC engine through a suitable power driving mechanism such as gear train. Further, a different electric machine coupled to the crankshaft is used to generate electric power required to charge the battery and power other electrical loads.

In an integrated starter generator (ISG) system for IC engines, a single electric machine connected to crankshaft is used for both engine starting and electric power generation operation. Such system has many advantages over conventional starting/power generation system such as lower weight, elimination of many wear-prone components leading to higher reliability and flexibility in starting/power generation schemes.

In an ISG system, an electronic control unit (ECU) is placed between the battery and the electric machine. The ECU regulates a bidirectional electric power flow between the battery and the electric machine. During engine start operation, it draws power from battery and feeds it to electric machine, whereas during power generation operation, it regulates electric power flow from electric machine to battery.

The ISG ECU typically consists of a power MOSFET bridge connected between a DC voltage bus. The voltage bus is connected to the battery. By suitably switching on MOSFETs in the bridge, the power flow to and from battery is regulated by the ECU. A MOSFET by construction has a parasitic diode across its source and drain terminals. Due to presence of this diode, when the ISG system operates as a power generation system, the MOSFET bridge used for driving the electric machine acts as a bridge rectifier, resulting in formation of a rectified DC voltage in the DC voltage bus. Since this rectification is a result of body diode of MOSFETs, it cannot be directly controlled by deactivating the MOSFETs.

The electric machine used for ISG operation is typically a three phase permanent magnet machine. In a permanent magnet machine, the back-emf generated at the machine terminals is proportional to speed of rotation of the machine, and cannot be actively controlled (for example by field excitation control). Thus, during operation of the machine in power generation, the voltage in the DC bus increases with increase in operation speed. Beyond a certain operation speed, the DC bus voltage crosses the safe operating voltage, which can damage the ECU. Thus, there is a need to ascertain a safe operating voltage at DC bus during power generation operation. Further, in case the DC voltage bus is directly connected to the battery, above engine speeds where the rectified DC bus voltage is more than the battery voltage, it is required to reduce the power generated by the electric machine to ensure that the battery is not over-charged.

One way of reducing the rectified DC bus voltage and consequently the generated electric power is to operate on the MOSFET bridge in a fashion where the stator coil of the electric machine is periodically shorted. This form of power regulation is referred to as "shunt-control". In this form of electric machine control, the energy in the electric machine is dissipated across the machine stator and in power MOSFETs rather than appearing in the DC bus. While this operation ensures that DC bus voltage remains within permissible limits, it results in an inefficient power generation operation due to heating of stator coil and MOSFET bridge which is undesirable. Further, depending on the machine characteristics and safe operating voltage of DC bus, such shunt-method of generation control may need to be performed at operating speeds which are often experienced during normal engine operation. On the other hand, if machine characteristics are so chosen that the shunt-method of generation control is to be performed only at high operating speeds which are not experienced often in normal engine operation, then at low engine speeds the back-emf generated at machine terminals may not be enough to supply required power to battery and other electrical loads. Further, the current required for cranking of engine is unduly increased.

Therefore, there is a need of an ECU architecture which allows flexibility in choosing the electric machine characteristics such that the shunt-method of power generation control is performed at sufficiently high operation speeds while ensuring that sufficient power is available at low operation speeds to supply required electrical power.

SUMMARY OF THE INVENTION

In an embodiment, the present invention provides a system for controlling electrical power generated by a permanent magnet machine, the permanent magnet machine coupled to an internal combustion engine, the system comprising a central processing unit configured to, determine speed of the machine, and compare the machine speed with a predetermined range of machine speeds, a series power switching circuit connected between the machine and a battery, a bus decoupling power switch connected between a voltage bus and the battery, and a bridge switching circuit connected between the voltage bus and the machine, the bridge switching circuit configured to amplify voltage generated by the machine if the machine speed is less than a predetermined value or fall within a predetermined range thereby charging the battery with amplified voltage even at lower machine speeds, wherein the central processing unit selectively connects the bridge switching circuit with the battery by actuating the bus decoupling switch and/or the series power switching circuit depending upon the machine speed.

In some embodiments, the bridge switching circuit amplifies the voltage generated by the machine if a pulse modulated signal is applied to the bridge switching circuit by the central processing unit.

In some embodiments, the bus decoupling switch is switched off if the voltage generated is more than the predetermined range.

In some embodiments, wherein the bridge switching circuit comprising an upper H-bridge MOSFET or IGBT and a lower H-bridge MOSFET or IGBT per phase.

In some embodiments, the series power switching circuit comprising a MOSFET or Insulated Gate Bipolar Transistor (IGBT) and a diode per phase.

In some embodiments, the series power switching circuit comprising a Silicon Controlled Rectifier (SCR) per phase.

In some embodiments, the bus decoupling power switch comprising a MOSFET or an Insulated Gate Bipolar Transistor (IGBT).

A BRIEF DESCRIPTION OF THE DRAWINGS

The abovementioned, other features and advantages of the various embodiments of the invention, and the manner of attaining them, will become more apparent and will be better understood by reference to the accompanying drawings, wherein.

DETAILED DESCRIPTION OF THE PREFERRED EMBODIMENTS

The present invention relates to system for controlling operation of an integrated starter generator which can perform starting control and generation control such that shunt-method of generation control is required only at high operating speeds and sufficient electric power is generated at low operating speeds, while cranking current is not unduly increased.

Figure 1:
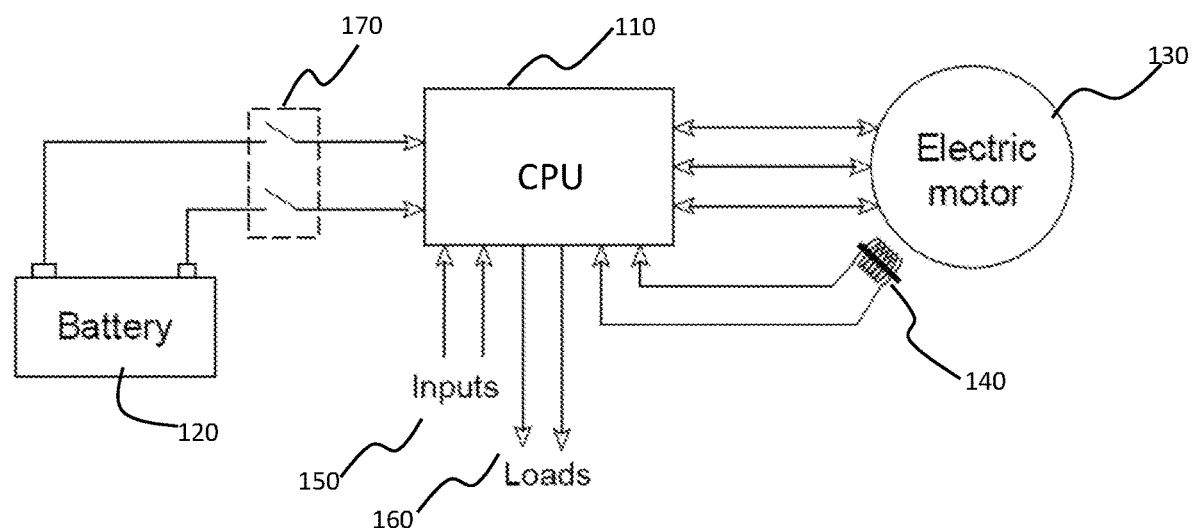
FIG. 1 is a schematic diagram of system for controlling electrical power generated by a permanent magnet machine coupled to an internal combustion engine according to an embodiment of the present invention.

FIG. 1 shows a schematic diagram of a system in accordance with an embodiment of the present invention. A central processing unit (CPU) 110 is connected to the battery 120 and a polyphaser permanent magnet electric machine 130. The CPU receives input from an ignition trigger sensor and possibly from sensors used for sending the electric machine rotor position 140. The CPU also receives inputs from a set of other sensors and switches 150 which are used for overall control of the engine operation and ISG operation. Examples of such sensors are thermal sensor used for measurement of engine temperature and throttle position sensor. Examples of such switches are an electric start switch, brake switch, clutch switch etc. The CPU also drives a set of electrical loads 160. Examples of electrical loads are ignition coil, headlamp, auto-choke solenoid and brake lamp. The system may also comprise of a relay 170 to connect battery terminals to CPU.

Figure 2:
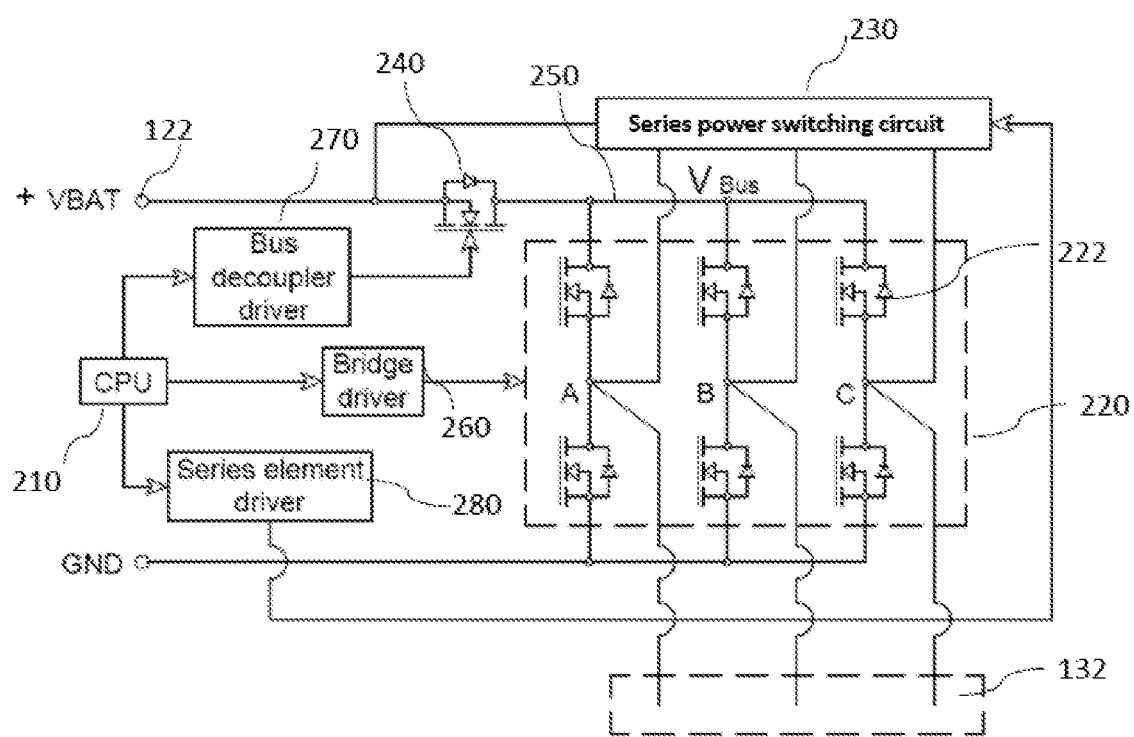
FIG. 2 is a schematic diagram of system for controlling electrical power generated by a permanent magnet machine coupled to an internal combustion engine according to an embodiment of the present invention.

FIG. 2 shows a circuit diagram of a system for the power generated by the ISG in power generation mode in accordance with an embodiment of the present invention. The system comprises a bridge switching circuit 220, a series power switching circuit 230, a bus decoupling power switch 240 and a CPU 210. The bridge switching circuit has an input side and an output side where the input side is connected to machine terminals 132 and the output side is connected to a voltage bus 250. In an embodiment, the bridge switching circuit is used to selectively connect the voltage bus (DC) to motor terminals. The bridge switching circuit is driven by a bridge driving circuit 260.

The bus decoupling power switch has an input side and an output side where the input side is connected to the voltage bus and the output side is connected to a battery terminal 122. In an embodiment, the bus decoupling power switch selectively connects the battery positive terminal with the voltage bus. In an embodiment, the bus-decoupling power switch is driven by a bus-decoupling driving circuit 270.

In an embodiment, the series power switching circuit has in input side and an output side where the input side is connected to machine terminals and the output side is connected to the battery terminal. Therefore, the series power switching circuit connects the machine terminals with the battery terminal. The series power switching circuit is driven by a series element driver 280. In an embodiment, the bus decoupling driving circuit, the bridge driving circuit and series power switching circuit receive commands from the CPU. Not shown in FIG. 2, the system may further include circuits for processing inputs, sensing the current through the electric machine, driving electric loads, and deriving auxiliary power supply for CPU.

Using the system shown in FIG. 2, the CPU can perform efficient control of motoring operation and charging operation of an ISG system. The control operation CPU using circuit shown in FIG. 2 will now be described.

Figure 3:
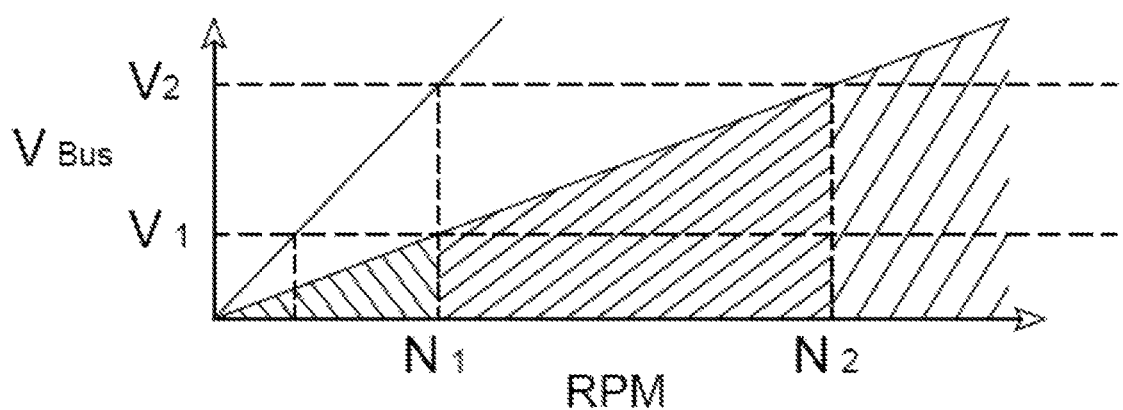
FIG. 3 is graphical representation of voltage that would appear at a voltage bus as a function of machine speed according to an embodiment of the present invention.

FIG. 3 shows the voltage that would appear at the DC voltage bus as a function of machine speed if the bridge switching circuit is not actuated, that is, the voltage that would appear due to rectification action of body diodes of the power switches. The figure shows two voltage levels. Voltage V1 is the minimum voltage required on DC voltage bus for battery charging to commence. Voltage V2 is the maximum safe voltage that can appear at DC voltage bus without having damaging consequences in the system. Thus, for generation process to begin, the voltage at DC voltage bus should be more than V1. Further, above machine speed that leads to voltage reaching more than V2, shunt-control of electric machine needs to be performed to ensure safe operation of system. Speed N1 denotes the operation speed at which the DC bus voltage is just equal to the voltage at which the power generation operation can commence. Speed N2 denotes the operation speed at which the DC bus voltage equals the maximum safe voltage for system operation. Voltages V1 and V2 are characteristics of the battery system and system design, while speeds N1 and N2 are characteristics of machine design.

Using the system as shown in FIG. 2, during power generation mode of the ISG, when the machine speed is below a predetermined value, say N1, the CPU sends command to the bus-decoupling driving circuit to switch ON the bus-decoupling power switch and switch OFF series power switching circuit. Alternately, the bus-decoupling power switch may be switched OFF and the series power switching circuit may be switched ON to achieve same effect. In an embodiment, the series power switching circuit comprises of an upper H-bridge MOSFET and a lower H-bridge MOSFET. The CPU also sends commands to the bridge driving circuit to operate the bridge switching circuit in a pulse-width-modulation (PWM) switching manner so as to boost the available input voltage to a voltage required for power generation/amplified voltage (typically slightly more than battery voltage). Therefore, the battery is charged with the amplified voltage even at lower machine speeds. For efficient power generation, the switching action needs to be synchronized with the position of the permanent magnet rotor—a process known as commutation. Several methods for achieving the commutation action are possible, such as using a hall-element magnet position sensor, using battery or machine current, detecting a voltage level of the back-emf signal or using an absolute rotor position sensor. Alternately, the boost-method of power generation can be performed independently of any position sensor by applying synchronous PWM to the lower H-bridge MOSFETs. In the ON period the PWM cycle, all lower bridge MOSFETs are turned ON. This effectively shorts stator terminals and results in a current build up in the stator inductors. When the lower H-bridge MOSFETs are switched OFF, the current flows through the upper H-bridge MOSFETs 222 and the bus-decoupling power switch or the series power switching circuit into the battery terminals.

Figure 4:
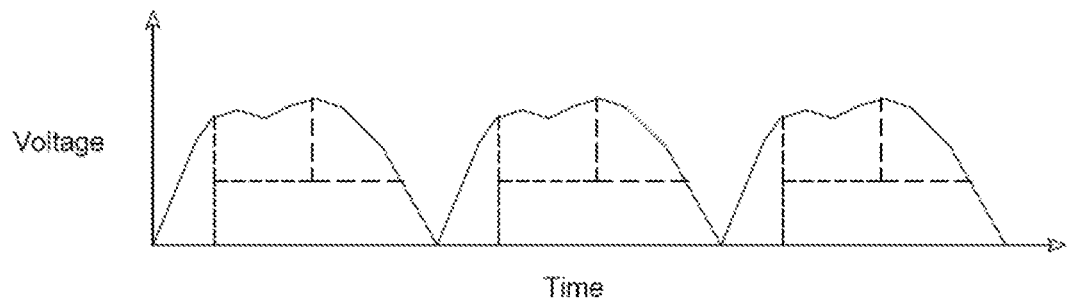
FIG. 4 is a graphical representation of voltage that appears at an input side of series switching circuit against time duration for which series power circuit is actuated according to an embodiment of the present invention.
Figure 5:
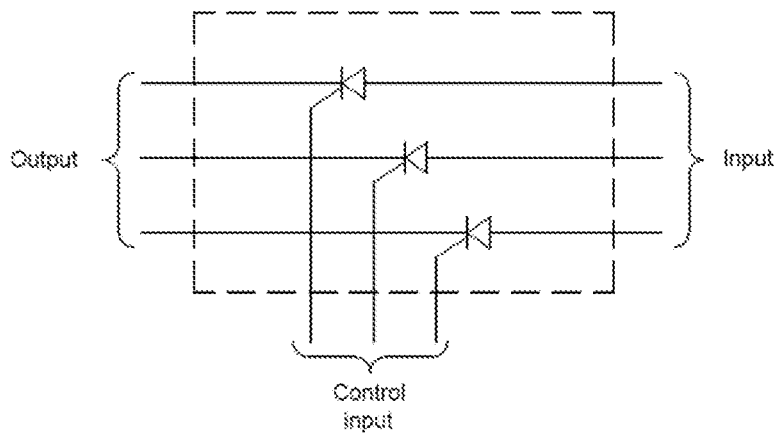
FIG. 5 shows a three phase series power switching circuit constructed using a silicon controlled rectifier (SCR) according to an embodiment of the present invention.
Figure 6:
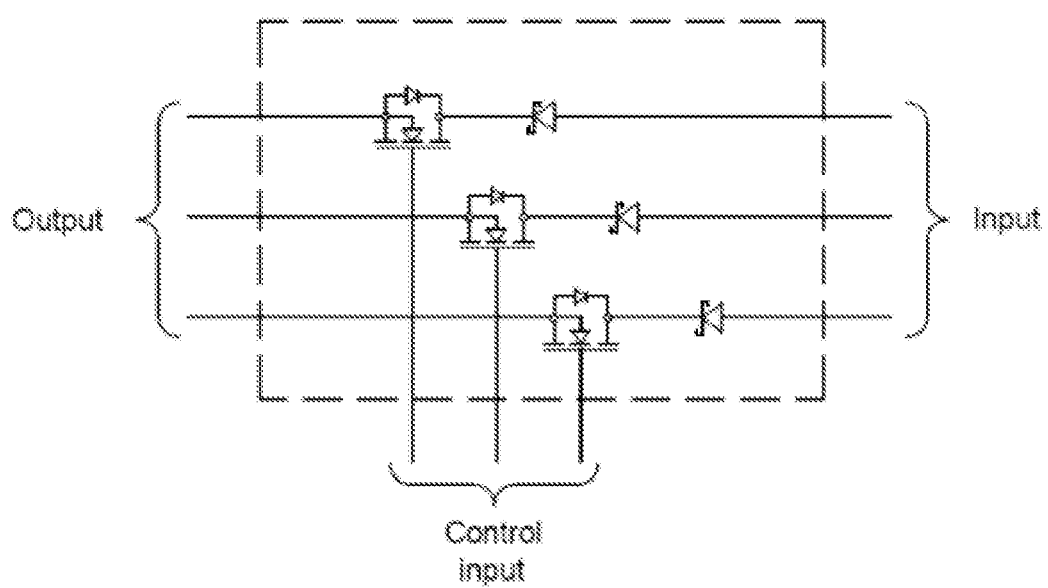
FIG. 6 shows a three phase series power switching circuit constructed using a MOSFET and a schottky diode per phase.

When the machine speed is above N1, where the back-emf voltage of the electric machine is above the voltage required for power generation, the CPU sends command to the bus-decoupling driving circuit to switch off the bus decoupling power switch, and actuates the series switch driving circuit to selectively connect the appropriate motor terminal to battery. The amount of time for which the motor terminal is connected to battery is also controlled by the CPU to regulate the amount of generated electrical power. This is demonstrated in FIG. 4, which shows the voltage that appears at the input side (electric machine side) of a series switching circuit, and indicates the amount of time for which a series power switching circuit is turned on by the CPU for two different levels of power generation. If required, the CPU may also actuate the bridge switching circuit using the bridge driving circuit to further boost the back-emf with an objective of extracting more power out of the electric machine. For actuating the series power switching circuit at appropriate points of time and for actuating the bridge switching circuit, the CPU needs to perform commutation action as described hereinabove. Typical possibilities of constructing a controllable series power switching circuit are shown in FIG. 5 and FIG. 6. FIG. 6 shows a three phase series power switching circuit constructed using a pair of MOSFET and schottky diode. FIG. 5 shows a three phase series power switching circuit constructed using a silicon controlled rectifier (SCR).

When the machine speed is above N2, the CPU sends command to the bus-decoupling driving circuit to switch ON the bus decoupling power switch, and sends commands to the bridge driving circuit to actuate the bridge switching circuit in a manner to achieve a shunt-method of power generation. In this region, the series power switches are turned off. Alternately, the bus decoupling power switch may be kept OFF and all series power switches turned ON to realize shunt-method of power generation. The CPU also sends commands to the bridge driving circuit to operate the bridge switching circuit in a pulse-width-modulation (PWM) switching manner. For efficient power generation in shunt-method control, the switching action needs to be synchronized with the position of the permanent magnet rotor—a process known as commutation. Several methods for achieving the commutation action are possible, such as using a hall-element magnet position sensor, using battery or machine current, detecting a voltage level of the back-emf signal or using an absolute rotor position sensor. Alternately, the shunt-method of power generation can be achieved by applying synchronous PWM to lower H-bridge MOSFETs. In the ON period the PWM cycle, all lower bridge MOS-FETs are turned ON. This effectively shorts stator terminals and results in a current build up in the stator inductors. When the lower H-bridge MOSFETs are switched OFF, the current flows through the upper H-bridge MOSFETs and through the bus-decoupling power switch or through the series power switching circuit into the battery terminals. A person skilled in the art would appreciate that an Insulated Gate Bipolar Transistor (IGBT) can be used instead of MOSFETs and use of IGBT instead of MOSFET is well within the scope of the present invention.

During motoring operation control which is used during cranking, the CPU sends command to the bus-decoupling driving circuit to switch ON the bus decoupling power switch, and sends commands to the bridge driving circuit to actuate the bridge switching circuit appropriately to ensure an efficient motoring operation. By choosing the bus decoupling power switch to have a low on-resistance, it can be ensured that practically the entire battery power is available for cranking.

Advantageously, by using the system as described hereinabove, it is possible to optimally choose the electric machine such that the shunt-method of generation control needs to be performed at speeds which are well-above the normal operation speeds. Since at normal operation speeds the power generation is performed through series switching circuit, the power generation is performed more efficiently leading to lesser fuel consumption and lesser concerns on thermal failure of electric machine. Further, since boost control can be performed at lower speeds, entire power available in electric machine can be extracted even from lower operational speeds. Lastly, since shunt-control is performed only when DC bus voltage crosses a safety threshold, the ECU operates in shunt-control mode rarely and hence, average efficiency of generation is maintained high. This architecture provides the flexibility to use a smaller machine size which in-turn results in lower costs.

It will be apparent to those skilled in the art that various modifications and variations can be made to the present invention without departing from the spirit and scope of the invention. Thus it is intended that the present invention cover the modifications and variations of this invention provided that such variations falls within the scope of the appended claims and their equivalents.

The invention claimed is:

1. A system for controlling electrical power generated by a permanent magnet machine, the permanent magnet machine coupled to an internal combustion engine, the system comprising:
    a central processing unit configured to:
        determine speed of the machine; and
        compare the machine speed with a predetermined range of machine speeds;
    a series power switching circuit connected between the machine and a battery;
    a bus decoupling power switch connected between a voltage bus and the battery; and
    a bridge switching circuit connected between the voltage bus and the machine, the bridge switching circuit configured to amplify voltage generated by the machine if the machine speed is less than a predetermined value or fall within a predetermined range thereby charging the battery with amplified voltage even at lower machine speeds;

wherein the central processing unit selectively connects the bridge switching circuit with the battery by actuating the bus decoupling switch and/or the series power switching circuit depending upon the machine speed.

2. The system as claimed in claim 1, wherein the bridge switching circuit amplifies the voltage generated by the machine if a pulse width modulated signal is applied to the bridge switching circuit by the central processing unit.

3. The system as claimed in claim 1, wherein the bus decoupling switch is switched off if the voltage generated is more than the predetermined range.

4. The system as claimed in claim 1, wherein the bridge switching circuit comprising an upper H-bridge MOSFET or Insulated Gate Bipolar Transistor (IGBT) and a lower H-bridge MOSFET or Insulated Gate Bipolar Transistor (IGBT) per phase.

5. The system as claimed in claim 1, wherein the series power switching circuit comprising a MOSFET or Insulated Gate Bipolar Transistor (IGBT) and a diode per phase.

6. The system as claimed in claim 1, wherein the series power switching circuit comprising a Silicon Controlled Rectifier (SCR) per phase.

7. The system as claimed in claim 1, wherein the bus decoupling power switch comprising a MOSFET or an Insulated Gate Bipolar Transistor (IGBT).

* * * * *